(12) United States Patent
Obana (10) Patent No.: US 8,861,717 B2
(45) Date of Patent: Oct. 14, 2014

(54) VERIFICATION DEVICE, SECRET INFORMATION RESTORATION DEVICE, VERIFICATION METHOD, PROGRAM, AND SECRET SHARING SYSTEM

(75) Inventor: Satoshi Obana, Minato-ku (JP)

(73) Assignee: NEC Corporation, Tokyo (JP)

(*) Notice: Subject to any disclaimer, the term of this patent is extended or adjusted under 35 U.S.C. 154(b) by 322 days.

(21) Appl. No.: 13/514,073

(22) PCT Filed: Oct. 21, 2010

(86) PCT No.: PCT/JP2010/068586
§ 371 (c)(1),
(2), (4) Date: Jun. 6, 2012

(87) PCT Pub. No.: WO2011/077819
PCT Pub. Date: Jun. 30, 2011

(65) Prior Publication Data
US 2012/0243679 A1    Sep. 27, 2012

(30) Foreign Application Priority Data
Dec. 22, 2009 (JP) ................. 2009-290786

(51) Int. Cl.
*H04K 1/00* (2006.01)
*H04L 9/10* (2006.01)
*H04L 9/28* (2006.01)
*H04L 9/08* (2006.01)
*G06F 21/62* (2013.01)

(52) U.S. Cl.
CPC ............ *H04L 9/085* (2013.01); *G06F 21/6209* (2013.01); *G06F 2221/2113* (2013.01); *G06F 2221/2117* (2013.01); *G06F 2221/2141* (2013.01); *G06F 2221/2107* (2013.01); *G06F 21/6218* (2013.01)
USPC ........................................................ 380/28

(58) Field of Classification Search
CPC ....................................................... G06F 21/24
USPC ............................................................ 380/28
See application file for complete search history.

(56) References Cited

U.S. PATENT DOCUMENTS 5,625,692 A * 4/1997 Herzberg et al. ............. 380/286
8,397,142 B2 * 3/2013 Obana ........................... 714/784

(Continued)

FOREIGN PATENT DOCUMENTS

JP      2004-229105 A      8/2004

(Continued)

OTHER PUBLICATIONS

Kurosawa, Kaoru, et al., "t-Cheater Identifiable (k,n) Threshold Secret Sharing Schemes," Proc. Crypto'95, Lecture Notes in Computer Science, 1995, pp. 410-423, vol. 963.

Obana, Satoshi, "Almost Optimum t-Cheater Identifiable Secret Sharing Schemes," 2007 Crypotolgy and Information Security Symposium, 2007, 3D1-1.

(Continued)

*Primary Examiner* — Teshome Hailu
*Assistant Examiner* — Thanh Le
(74) *Attorney, Agent, or Firm* — Sughrue Mion, PLLC (57) ABSTRACT

A verification device, upon the input of any k items of shared information among n items of shared information and "t": generates as subsets all combinations that select r items of shared information among the k items of shared information received as input where r satisfies r≥t+2; for each of the subsets, uses the cheater-identification information belonging to the subset to judge whether dishonest shared information is included in the subset; and based on the judgment results, generates and supplies as output a cheater set indicating dishonest shared information among the k items of shared information.

9 Claims, 5 Drawing Sheets

(56) References Cited

U.S. PATENT DOCUMENTS

2010/0031128 A1 2/2010 Obana
2011/0126291 A1* 5/2011 Araki .............................. 726/26

FOREIGN PATENT DOCUMENTS

| JP | 2007-135170 A | 5/2007 |
| JP | 2008-250931 A | 10/2008 |
| WO | 2008/050544 A1 | 5/2008 |
| WO | 2009/025220 A1 | 2/2009 |

OTHER PUBLICATIONS

Ogata, Wakaha, et al., "Optimum Secret Sharing Scheme Secure Against Cheating," SIAM Journal on discrete Mathematics, 2006, pp. 79-95, vol. 20, No. 1.
Rabin, Tal, et al., Verifiable Secret Sharing and Multiparty Protocols with Honest Majority (Extended Abstract), Proc.STOC'89, 1989, pp. 73-85.
Shamir, Adi, "How to Share a Secret," Communications of the ACM, Nov. 1979, pp. 612-613, vol. 22, No. 11.
Tompa, Martin, et al., "How to Share a Secret wiht Cheaters," Journal of Cryptology, 1988, pp. 133-138, vol. 1.

* cited by examiner

Fig.1

```
        (secret information)
                s
                          (threshold value)
                                k    (shared information
                                         total number)    (assumed cheater number)
                                              n                      t
``` shared information generation device — 10

101 — secret information sharing unit

102 — cheater-identification information generation unit

21 — storage device (v{1}, A{1})
22 — storage device (v{2}, A{2})
2n — storage device (v{n}, A{n})

(v{i_1}, A{i_1}), (v{i_2}, A{i_2}) ··· (v{i_k}, A{i_k})

(assumed cheater number) t   (threshold value) k secret information restoration device — 30

301 — subset generation unit

302 — coherence checking unit

303 — cheater identification unit

304 — secret information restoration unit

CL (cheater list)    s (secret information)

Fig.6

VERIFICATION DEVICE, SECRET INFORMATION RESTORATION DEVICE, VERIFICATION METHOD, PROGRAM, AND SECRET SHARING SYSTEM

CROSS REFERENCE TO RELATED APPLICATION

This application is a National Stage of International Application No. PCT/JP2010/068586, filed on Oct. 21, 2010, which claims priority from Japanese Patent Application No. 2009-290786, filed on Dec. 22, 2009, the contents of all of which are incorporated herein by reference in their entirety.

TECHNICAL FIELD

The present invention relates to a secret-sharing scheme that is capable of detecting cheaters.

BACKGROUND ART

Secret sharing schemes are known as a cryptographic technology that can divide secret information into a plurality of items of shared information (shares) and then reconstruct the secret only when a predetermined number of shares have been gathered.

Because each individual share (item of shared information) is information having no correlation with the secret information, managing this shared information by sharing it among a plurality of sites can prevent a cheater who has dishonestly acquired shared information from reconstructing the original secret information. As a result, a secret-sharing scheme can maintain high security against disclosure of secrets.

In addition, even in the event of the loss of a number of items of shared information, a secret-sharing scheme enables the restoration of secret information as long as a predetermined number of items of shared information remain, and therefore can maintain high security against information loss.

The best-known scheme among such secret-sharing schemes is the (k, n) threshold secret-sharing scheme described in Non-Patent Document 1. Among secret-sharing schemes, this scheme is characterized by: (1) the division of secret information into n items of shared information, (2) the ability to restore the secret information when any k shares among these shares are collected, and (3) the inability to obtain any information relating to the secret from partial information of less than k shares.

The (k, n) threshold secret-sharing scheme described in Non-Patent Document 1 does not take into consideration the dishonesty of the person managing the shared information or the malfunctioning of a device that manages the shared information. As a result, when k items of shared information are collected to reconstruct a secret, the occurrence of even one item of shared information that differs from the original information not only prevents the correct reconstruction of the secret information but also prevents the detection of the fact that the reconstructed secret information differs from the original secret information.

In order to solve this problem, a method is employed in the secret-sharing scheme described in Non-Patent Document 2 or Non-Patent Document 3 that can detect difference of the reconstructed secret information from the original secret information at the time of reconstructing a secret, even when k−1 items of falsified shared information have been collected.

Schemes that can not only detect that falsification has occurred at the time of reconstruction, but that can also identify which shared information was falsified are described in Non-Patent Documents 4-6.

According to the secret-sharing scheme described in Non-Patent Document 4, there is a high probability that all t items of falsified shared information can be identified if the number t of items of falsified shared information is within the range $k \geq 2t+1$.

Non-Patent Document 5 and Non-Patent Document 6 describe secret-sharing schemes in which there is a high probability that all falsified shared information can be identified if the number of cheaters t is within the range of $k \geq 3t+1$, although the number of items of falsified shared information that can be identified is less than that of the method described in Non-Patent Document 4.

When attempting to enable identification of a multiplicity of items of falsified shared information in the secret-sharing schemes such as described in Non-Patent Documents 4-6, the data size of the items of shared information increases proportionately. On the other hand, when attempting to decrease the data size of each item of shared information, the number of items of falsified shared information that can be identified decreases.

In the former example, the secret-sharing schemes described in Non-Patent Documents 5 and 6 have the disadvantage of not being able to identify falsified shared information if the number t of items of falsified shared information is not within the range that satisfies $k \geq 2t+1$, which is narrower than the case of Non-Patent Document 4, but has the advantage of enabling a greater decrease of the data size of each item of shared information than the secret-sharing scheme described in Non-Patent Document 4.

Specifically, the data size of a share is $p*q^{(3n-3)}$ in the method of Non-Patent Document 4. In contrast, the size of a share is $p*q^{(t+1)}$ in the method of, for example, Patent Document 5, which is relatively small. Here, p is order of a predetermined finite field and is a power of a prime number, and q is a prime number that satisfies:

$q \geq n*p$

LITERATURE OF THE PRIOR ART

Non-Patent Documents

Non-Patent Document 1: Adi Shamir, "How to share a secret," Comm. ACM, 22(11) (1979) 612-613

Non-Patent Document 2: Martin Tompa, Heather Woll, "How to Share a Secret with Cheaters," Journal of Cryptology, Vol. 1 (1988) 133-138

Non-Patent Document 3: Wakaha Ogata, Kaoru Kurosawa, Douglas R Stinson, "Optimum Secret Sharing Scheme Secure Against Cheating," SIAM Journal on Discrete Mathematics, Vol. 20, No. 1 (2006) 79-95

Non-Patent Document 4: T. Rabin and M. Ben-Or, "Verifiable Secret Sharing and Multiparty Protocols with Honest Majority," Proc. STOC '89 (1985) 73-85

Non-Patent Document 5: K. Kurosawa, S. Obana, and W. Ogata, "t-Cheater Identifiable (k, n) Secret Sharing Schemes," Proc. Crypto '95, Lecture Notes in Computer Science, Vol. 963, Springer Verlag (1995) 410-423

Non-Patent Document 6: Obana, Satoshi, "Almost Optimum t-Cheater Identifiable secret sharing schemes," 2007 Cryptology and Information Security Symposium, SCI 2007 (2007) 3D1-1

SUMMARY OF THE INVENTION

Problem to be Solved by the Invention

In the current state as described above, when the number of cheaters t is assumed to exceed the range of $k \geq 3t+1$, the schemes described in Non-Patent Documents 5 and 6 in which the data size of each share is small cannot be used and the scheme described in Non-Patent Document 4 in which the data size of each share is large must be used.

It is an object of the present invention to provide a secret-sharing scheme that enables the identification of falsified shared information even when the number of falsified shares is assumed to exceed the range in which falsified shares can be identified as described in Non-Patent Documents 5 and 6, and further, in which the data size of shares is smaller than in the scheme described in Non-Patent Document 4.

Means for Solving the Problem

In order to achieve the above-described objects, the verification device of the present invention is a verification device: that takes as shared secret information each n item of information that is generated from secret information by a (k, n) threshold secret-sharing scheme that uses a polynomial of the $(k-1)^{th}$ degree on a finite field based on power p of a prime number, that takes q as a prime number that satisfies the relation $q \geq n*p$, that takes as r and t natural numbers that satisfy $k \geq t+r$, and that takes as cheater identification information n items of information generated by means of a t-Cheater Identifiable secret-sharing scheme that uses a polynomial of the $t^{th}$ degree on finite field GF(q) so as to enable identification of any of up to t items of dishonest shared secret information included in the n items of shared secret information; and that identifies dishonest shared information from any k items of shared information among n items of shared information that are pairs of shared secret information and cheater-identification information; the verification device including:

input means that receives as input k items of shared information and t;

subset generation means that generates all subsets that are combinations that select, from the k items of shared information applied as input to the input means, r items of shared information where $r \geq t+2$;

coherence-judging means that, by using each item of cheater-identification information that belongs to the subset and a polynomial of the $t^{th}$ degree, judges for each of the subsets that were generated by the subset generation means whether dishonest shared information is included in the subset; and cheater-identification means that, based on the judgment result by the coherence judging means and the shared information contained in each subset, identifies dishonest shared information.

The verification method of the present invention is a verification method that takes as shared secret information each n item of information that is generated from secret information by a (k, n) threshold secret-sharing scheme that uses a polynomial of the $(k-1)^{th}$ degree on a finite field based on power p of a prime number, that takes q a prime number that satisfies the relation $q \geq n*p$, that takes as r and t natural numbers that satisfy $k \geq t+r$, that takes as cheater identification information n items of information generated by means of a t-Cheater Identifiable secret-sharing scheme that uses a polynomial of the $t^{th}$ degree on finite field GF(q) so as to enable identification of any of up to t items of dishonest shared secret information included in the n items of shared secret information, and that identifies dishonest shared information from any k items of shared information among n items of shared information that are pairs of shared secret information and cheater-identification information; wherein:

subset generation means generates all subsets that are combinations that select, from k items of shared information, r items of shared information where $r \geq t+2$;

coherence-judging means, by using each item of cheater-identification information that belongs to the subset and a polynomial of the $t^{th}$ degree, judges for each of the subsets that were generated by the subset generation means whether dishonest shared information is contained in the subset; and cheater-identification means, based on the judgment result by the coherence judging means and the shared information contained in each subset, identifies dishonest shared information.

The program of the present invention is a program that controls a computer that takes as shared secret information each n item of information that is generated from secret information by a (k, n) threshold secret-sharing scheme that uses a polynomial of the $(k-1)^{th}$ degree on a finite field based on power p of a prime number, that takes q as a prime number that satisfies the relation $q \geq n*p$, that takes as r and t natural numbers that satisfy $k \geq t+r$, that takes as cheater identification information n items of information generated by means of a t-Cheater Identifiable secret-sharing scheme that uses a polynomial of the $t^{th}$ degree on finite field GF(q) so as to enable identification of any of up to t dishonest items of shared secret information included in the n items of shared secret information, and that identifies dishonest shared information from any k items of shared information among n items of shared information that are pairs of shared secret information and cheater-identification information; the program causing the computer to execute:

a subset generation procedure of, upon input of k items of shared information and t, generating all subsets that are combinations that select, from the k items of shared information, r items of shared information where $r \geq t+2$;

a coherence-judging procedure of judging, for each of the subsets that were generated by the subset generation procedure, whether dishonest shared information is contained in the subset by using each item of cheater-identification information that belongs to the subset and a polynomial of the $t^{th}$ degree; and a cheater-identification procedure of, based on the judgment result by the coherence-judging procedure and the shared information contained in each subset, identifying dishonest shared information.

The secret sharing system of the present invention includes:

a secret information sharing device that generates n items of shared secret information from secret information by means of a (k, n) threshold secret-sharing scheme that uses a polynomial of the $(k-1)^{th}$ degree on a finite field based on a power p of a prime number, that takes as q a prime number that satisfies the relation $q \geq n*p$ and takes as r and t natural numbers that satisfy $k \geq t+r$ to generate n items of cheater-identification information by means of a t-Cheater identifiable secret-sharing scheme that uses a polynomial of the $t^{th}$ degree on a finite field GF(q) so as to enable identification of up to any t items of dishonest shared information among the n items of shared information, and that supplies n items of the shared secret information and n items of the cheater-identification information; and a verification device that, upon input of any k items of shared information among n items of shared information that are pairs of shared secret information and cheater-identification information generated by the secret information sharing device and t, generates all subsets that are combinations that select, from the k items of shared information, r items of shared information where r satisfies $r \geq t+2$, judges for each subset whether dishonest information is included in the subset by using each item of cheater-identification information that belongs to the subset and a polynomial of the $t^{th}$ degree, and based on the judgment result and the shared information that is contained in each subset, identifies dishonest shared information.

Effect of the Invention

According to the present invention, a verification device finds as subsets all combinations that select r items where r≥t+2 from k items of shared information obtained by using a polynomial of the $(k-1)^{th}$ degree on GF(p) and a polynomial of the $t^{th}$ degree on GF(q), judges, for each subset, whether dishonest shared information is included in the subset, and generates cheater sets. According to this configuration, the verification device is able to judge that one or more items of dishonest shared information do not exist among the subsets if there are at least r items of honest shared information even where there are t items of dishonest shared information among the k items of shared information, and can identify with high probability up to t items of dishonest shared information among the k items based on the judgment result of each subset.

As a result, up to t items of dishonest shared information can be detected where t satisfies the relation k≥r+t. If the range 2t≥r is set, the user can set a value of t that satisfies k≥3t, and can set t to be greater than a case in which k≥3t+1 for k of a fixed value.

In addition, due to the use of a polynomial of the $(k-1)^{th}$ degree on a finite field based on p such as GF(p) and a polynomial of the $t^{th}$ degree on GF(q), the size of the shared information is p*q. As a result, the size of shared information is smaller than in the method of Non-Patent Document 4 in which k≥2t+1 is assumed and the size of shared information is $p*q^{\wedge}(3n-3)$.

BEST MODE FOR CARRYING OUT THE INVENTION

First Exemplary Embodiment

Figure 1:
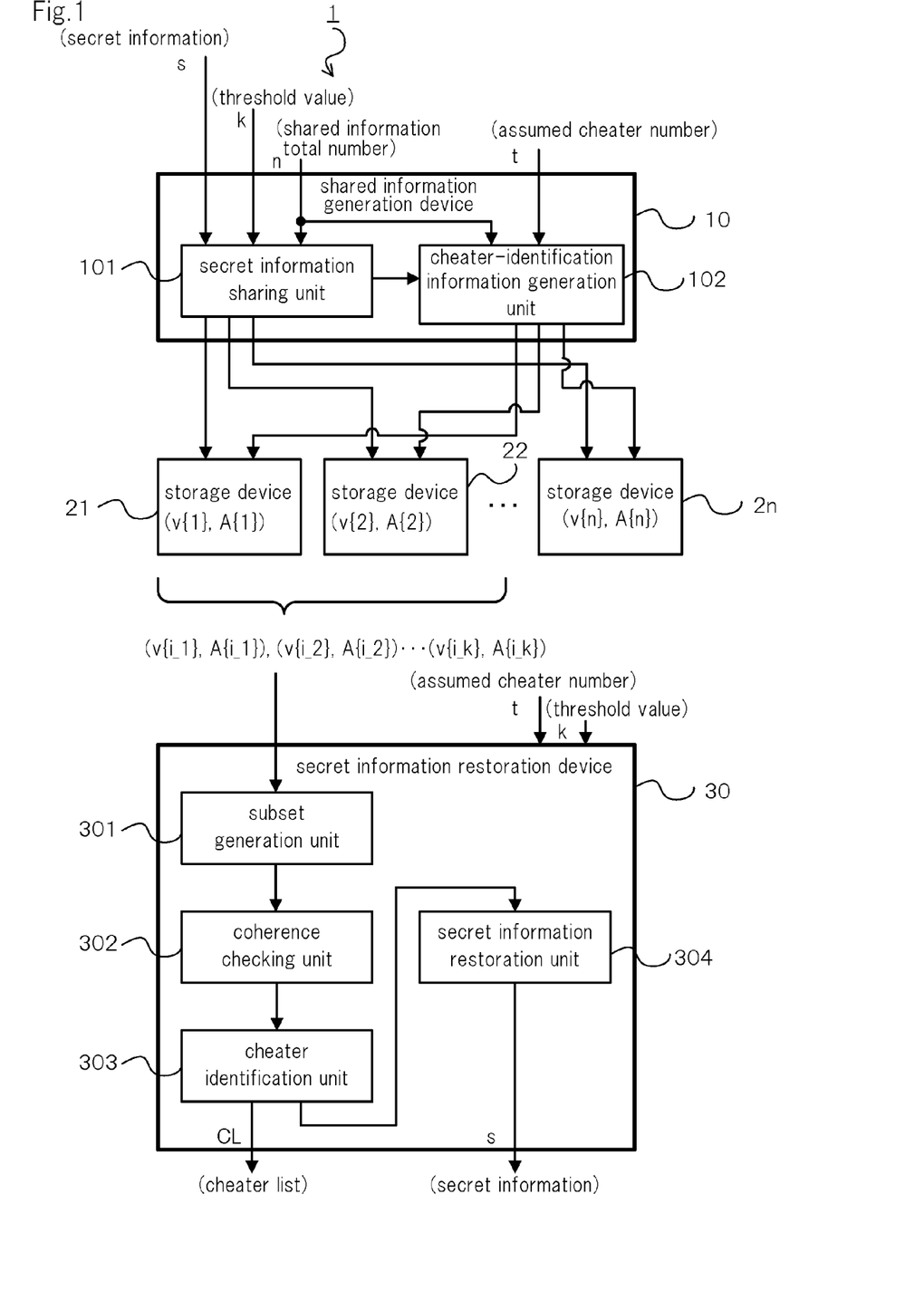
FIG. 1 is a block diagram showing an example of the configuration of a secret sharing system of the first exemplary embodiment of the present invention.

The first exemplary embodiment for carrying out the present invention is next described with reference to the accompanying drawings. FIG. 1 is a block diagram showing an example of the configuration of secret sharing system 1 of the present exemplary embodiment. Secret sharing system 1 is a system that uses a (k, n) threshold secret-sharing scheme to divide shared information into n items of shared information and that restores the secret information from any k items of shared information contained in n items of shared information. Referring to FIG. 1, secret sharing system 1 includes shared information generation device 10 and secret information restoration device 30.

In the present exemplary embodiment, shared information includes shared secret information and cheater-identification information. The shared secret information is n items of information that are generated by a (k, n) threshold secret-sharing scheme from secret information that is to be concealed and that is information to be used for restoring secret information. The cheater-identification information is information for detecting dishonest shared information and identifying the dishonest shared information.

In addition, dishonest shared information is shared information that, after being generated by shared information generation device 10, has become information that differs from the original information at the time of generation due to falsification by an unauthorized person or due to the occurrence of a malfunction in a device that stores the shared information.

The detection of t items of dishonest shared information is hereinbelow referred to as "detecting t-cheaters."

Shared information generation device 10 receives as input: secret information s, threshold value k, shared information total number n, and assumed cheater number t. Shared information generation device 10 generates n items of shared information from this information.

Still further, secret information s is original information that is to be concealed, and is information that is the object of secret sharing. Threshold value k is the number of items of shared information that is the minimum necessary for restoring secret information s. Shared information total number n is the total number of items of shared information generated from secret information s.

The assumed cheater number t is the maximum number of cheaters that are assumed. In other words, when there are cheaters, the assumed cheater number t is the maximum number of cheaters that can be identified on the restoring side.

Shared information generation device 10 includes secret information sharing unit 101 and cheater-identification information generation unit 102.

Secret information sharing unit 101 receives as input secret information s, threshold value k, and shared information total number n. Secret information sharing unit 101 uses a (k, n) threshold secret-sharing scheme to divide and encode secret information s.

More specifically, secret information sharing unit 101 selects both uniform and random $(k-1)^{th}$ degree polynomials fs(x) on the finite field GF(p) such that fs(0)=s, and p is a predetermined order of a finite field and is the power of a prime number.

In the present exemplary embodiment, addition on a finite field is represented by +, subtraction is indicated by −, multiplication is represented by *, division is indicated by /, and power is indicated by ^.

In the present exemplary embodiment, fs(x) is defined by the following equation.

$$fs(x) = s + a\{1\}*x + a\{2\}*x^{\wedge}2 + \ldots a\{k-1\}*x^{\wedge}(k-1) \qquad (1)$$

Secret information sharing unit 101 uses the above-described equation (1) to calculate fs(1), fs(2), ... fs(n), and takes the results as shared secret information v{i} (i=1, 2, ... n). Secret information sharing unit 101 supplies the pair ({i}, v{i}) of {i} (i=1, 2, . . . n) and v{i} calculated from {i} to cheater-identification information generation unit 102 and supplies v{i} to a storage device.

In the present exemplary embodiment, each of the shared secret information v{i}, . . . v{n} is stored in a respective storage device of n storage devices 21-2n.

Cheater-identification information generation unit 102 receives as input ({i}, v{i}) and assumed cheater number t from secret information sharing unit 101.

Cheater-identification information generation unit 102 generates n items of cheater-identification information by a t-Cheater Identifiable secret-sharing scheme such that up to t cheaters can be identified.

More specifically, cheater-identification information generation unit 102 generates the $t^{th}$ degree polynomial C(x) on GF(q) that is selected uniformly and randomly. Here, q is a prime number that satisfies q≥n*p. In the present exemplary embodiment, C(x) is defined by the following equation.

$$C(x)=c\{0\}+c\{1\}\cdot x+\ldots c\{t\}*x^t \quad (2)$$

Cheater-identification information generation unit 102 substitutes the n items of ({i}, v{i}) from secret information sharing unit 101 into a predetermined one-to-one function φ to calculate φ({i}, v{i}). Cheater-identification information generation unit 102 substitutes φ({i}, v{i}) into C(x) that was defined by the above-described equation (2) and takes the results as n items of cheater-identification information A{i}.

Here, the one-to-one function φ is defined by, for example, the following equation.

$$\phi(\{i\},v(\{i\}))=p*(\{i\}-1)+v\{I\} \quad (3)$$

In the above-described equation (3), p*({i}-1)+v{i} is converted to GF(p) by mod q after being calculated as integers.

Cheater-identification information generation unit 102 supplies n items of cheater-identification information A{i} to storage devices.

In the present exemplary embodiment, each of the cheater-identification information of A{1}, . . . , A{n} is stored in a respective one of n storage devices 21-2N.

Figure 2:
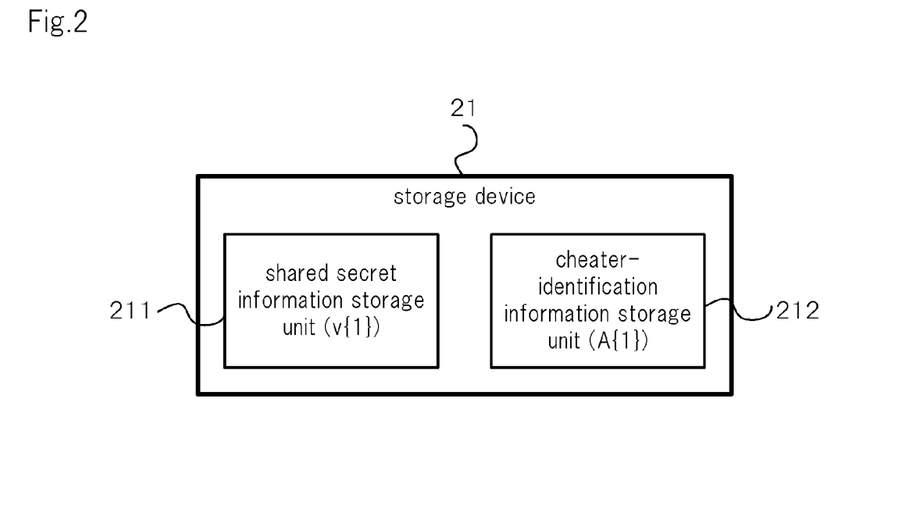
FIG. 2 is a block diagram showing an example of the configuration of the shared information generation device of the first exemplary embodiment of the present invention.

FIG. 2 is a block diagram showing an example of the configuration of storage device 21. As shown in FIG. 2, in the present exemplary embodiment, storage device 21 includes shared information storage unit 211 and cheater-identification information storage unit 212.

Shared secret information v{1} is stored in shared information storage unit 211. Cheater-identification information A{1} is stored in cheater-identification information storage unit 212. The configurations of storage devices 22-2n are also the same as the configuration of storage device 21 shown in FIG. 2.

Returning to FIG. 1, the configuration of secret information restoration device 30 is next described. Referring to FIG. 1, secret information restoration device 30 includes subset generation unit 301, coherence checking unit 302, cheater identification unit 303, and secret information restoration unit 304.

Secret information restoration device 30 generates cheater list CL and secret information s from k items of shared information, assumed cheater number t, and threshold value k and supplies the result as output. Cheater list CL is dishonest shared information among k items of shared information, i.e., a set of cheaters.

Assumed cheater number t and threshold value k are applied as input to subset generation unit 301. Subset generation unit 301 reads k items of shared secret information from the k shared secret information storage units among storage devices 21-2n. Subset generation unit 301 further reads k items of cheater-identification information from the k shared secret information storage units among storage devices 21-2n.

Subset generation unit 301 acquires k items of shared information (v{i-j}, A{i_j}) (j=1, 2, . . . k), the data pair of shared secret information and cheater-identification information that were read from the same storage device being one item of shared information.

Subset generation unit 301 finds all of the combinations that select r items where r satisfies the relation 2t≥r≥t+2 from the k items of shared information (v{i-j}, A{i-j}). In the present exemplary embodiment, it is assumed that r=t+2 in order to enable setting of the largest assumed cheater number for the same k.

In accordance with a request of coherence checking unit 302, subset generation unit 301 supplies these combinations as C(k, t+2) subsets S{m} (m=1, 2, . . . C(k, t+2)) to coherence checking unit 302.

The number C(k, t+2) of combinations that select t+2 items from among k items is found by the following equation.

$$C(k,(t+2))=k!/((t+2)!(k-t-2)!) \quad (4)$$

By sending a request signal to subset generation unit 301, coherence checking unit 302 acquires each subset S{m} from subset generation unit 301 and checks the coherence of the (t+2) items of shared information that belong to each of the subsets.

More specifically, coherence checking unit 302 uses the (t+2) items of shared secret information in the subsets that are to be verified and the one-to-one function φ that was used in secret information sharing unit 101 to calculate φ({j_1}, v{j_1}), . . . φ({j_(t+2)}, v{j_(t+2)}).

Coherence checking unit 302 then restores polynomials of the $t^{th}$ degree and lower from any t+1 items of cheater-identification information that is contained in the t+2 items of cheater-identification information and any t+1 items among φ({j_1}, v{j_1}), . . . φ({j_(t+2)}, v{j_(t+2)}). Coherence checking unit 302 then judges whether there are points that correspond to the one item of shared information that remains on the restored polynomial.

Coherence checking unit 302 thus judges whether (φ({j_1}, v{j-1}), A{j_1}) . . . (φ({j_(t+2)}, v{j_(t+2)}), v{j_(t+2)}) are points on the same polynomial of the $t^{th}$ degree or lower.

If the t+2 points that correspond to the shared information are points on the same polynomial of the $t^{th}$ degree or lower, coherence checking unit 302 judges that there is no dishonesty in all shared information in the subset.

If there is no dishonesty in all shared information, coherence checking unit 302 supplies the coherence-checked set L{m}={j_1}, . . . {j_(t+2)}. L{m} is information indicating a set of shared information for which it has been judged that dishonesty does not occur.

If there are one or more dishonest items in any of the shared information in the subsets, coherence checking unit 302 supplies an empty set L{m}.

For each of the C(k, t+2) subsets S{m}, coherence checking unit 302 finds a coherence-checked set L{m} and supplies these sets to cheater identification unit 303.

Cheater identification unit 303 finds the sum set G of the C(k, (t+2)) coherence-checked sets L{m}. Cheater identification unit 303 finds the differential sets between the set {i_1}, . . . {i_k} and the sum set G as the cheater list CL.

Cheater identification unit 303 supplies the cheater list CL to secret information restoration unit 304 and to outside secret information restoration device 30.

Secret information restoration unit 304 judges whether cheater list CL is an empty set. If CL is an empty set, it is assumed that dishonesty does not occur in all of the shared information. In this case, secret information restoration unit 304 uses a known method to restore secret information s from k items of shared secret information $v\{i\_j\}$. Methods of restoring secret information s include a method of solving simultaneous equations of the first degree in k unknowns or a method of using Lagrange's interpolation.

Secret information restoration unit 304 supplies secret information s that was restored to the outside of secret information restoration device 30.

By means of the above-described configuration in the present exemplary embodiment, secret information restoration device 30 has a high probability of being able to detect up to t cheaters with when the value of t is set such that t satisfies $k \geq 2t+2$. The reasons for this capability are next explained.

Secret information restoration device 30 restores a polynomial of the $t^{th}$ degree from t+1 points that were collected from t+1 items of shared information and implements identification of cheaters depending on whether points that corresponds to other shared information are on the restored polynomial.

A case is here assumed in which there are t cheaters. These cheaters have no knowledge of information relating to points held by other honest users (points corresponding to shared information in which dishonesty does not occur). As a result, even if these t cheaters should counterfeit points and then restore polynomials with other honest users, the probability that the points of other users will be points on these restored polynomials is extremely low. On the other hand, in order that honest users not be identified as cheaters, at least one point must lie on a (legitimate and free of forgery) polynomial that has been restored by t+1 items of shared information. As a result, the restoration of secret information requires a total of at least "t+1 honest users that restore polynomials"+"at least one user having points on a polynomial restored by t+1 users"+"t cheaters," i.e., 2t+2.

Accordingly, when $k \geq 2t+2$, there is a high probability that secret information restoration device 30 can identify up to t cheaters. More specifically, when dishonest information is included in the $i^{th}$ item of shared information, the probability that this shared information belongs to the output CL of cheater identification unit 303 and that cheaters will be identified is $1-1/q$.

Figure 3:
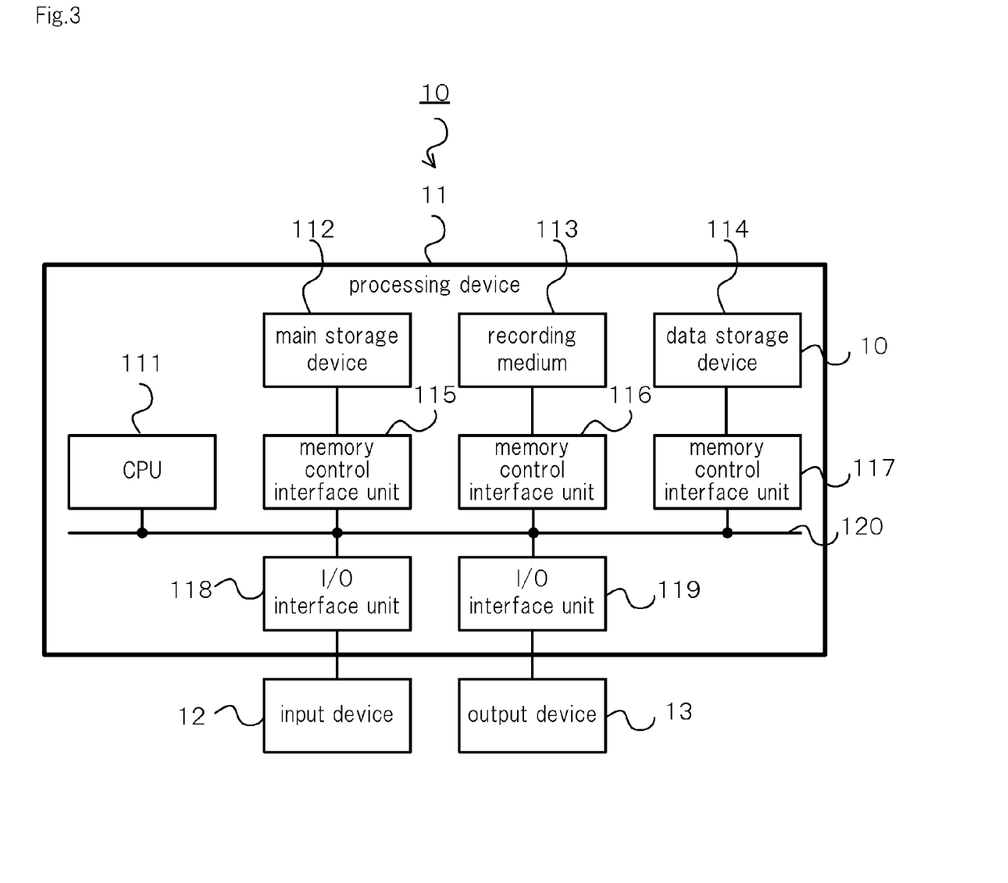
FIG. 3 is a block diagram showing an example of the configuration of the memory unit of the first exemplary embodiment of the present invention.

FIG. 3 is a block diagram showing an example of the configuration of a computer for realizing shared information generation device 10 or secret information restoration device 30 of the present exemplary embodiment. Referring to FIG. 3, this computer is provided with: processing device 11, input device 12, and output device 13. Processing device 11 executes predetermined processes according to a program. Input device 12 is a device used for the input of commands or information for processing device 11. Output device 13 is a device for monitoring the processing results of processing device 11.

Processing device 11 has a configuration that includes CPU (Central Processing Unit) 111, main storage device 112, recording medium 113, data storage device 114, memory control interface units 115-117, and I/O interface units 118 and 119, these components being interconnected by way of bus 120.

CPU 111 is a processor that executes a program. Main storage device 112 temporarily stores information necessary for the processing of CPU 111. Recording medium 113 stores the program that causes CPU 111 to execute processing. Data storage device 114 stores secret information or access structure data. Memory control interface units 115-117 are interface devices that control the reading and writing of the data of main storage device 112, recording medium 113, and data storage device 114.

In FIG. 3, an example is shown in which data storage device 114 is present in processing device 11, but data storage device 114 need not present be in processing device 11. As another example of a configuration, data storage device 114 exists separate from processing device 11, and may be connected to processing device 11. In addition, data storage device 114 can be used as storage devices 21-2n shown in FIG. 2.

Recording medium 113 is a magnetic disk, a semiconductor memory, an optical disk, or another recording medium.

Figure 4:
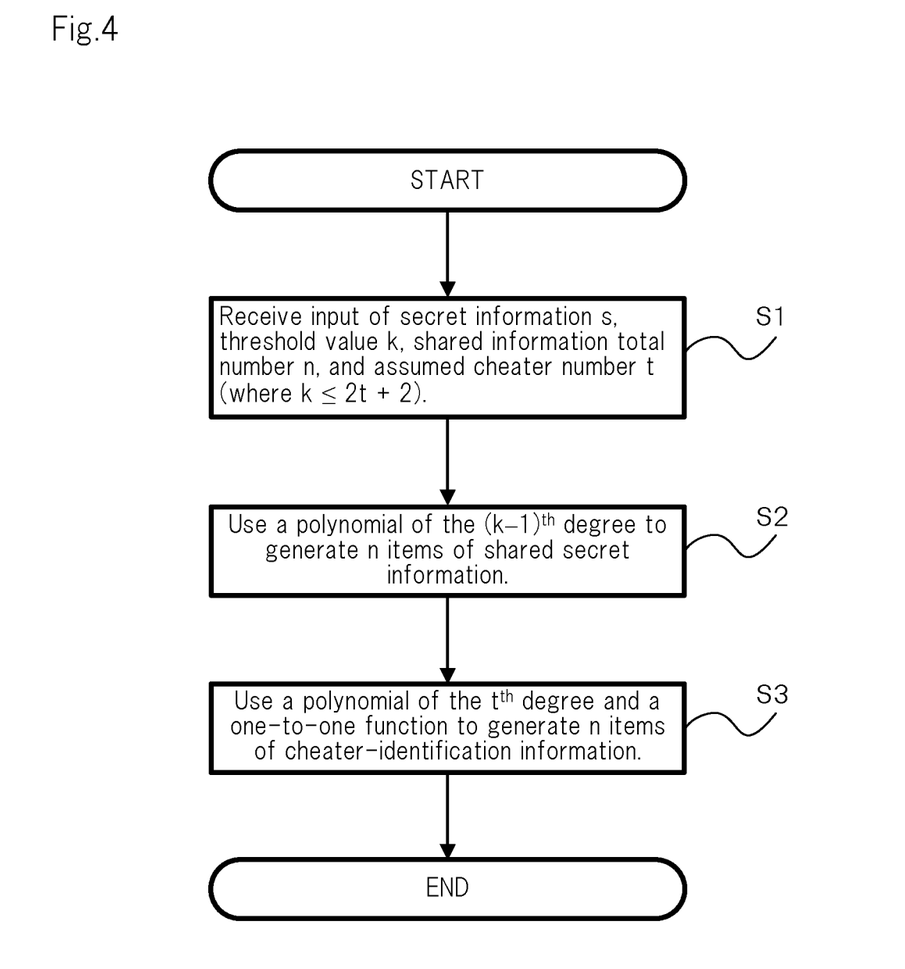
FIG. 4 is a flow chart showing the operations of the shared information generation device of the first exemplary embodiment of the present invention.

Referring to FIG. 4, the operations of shared information generation device 10 of the present exemplary embodiment are next described. FIG. 4 is a flow chart showing the operations of shared information generation device 10. These operations begin with the execution of an application for sharing secret information.

Referring to FIG. 4, shared information generation device 10 receives as input secret information s, threshold value k, shared information total number n, and assumed cheater number t (Step S1).

When each item of information has been received, secret information sharing unit 101 uses a polynomial of the $(k-1)^{th}$ degree to generate n items of shared secret information $v\{i\}$ from secret information s by means of a (k, n) threshold secret-sharing scheme. Secret information sharing unit 101 supplies these items of shared secret information to storage devices 21-2n (Step S2).

Cheater-identification information generation unit 102 uses a polynomial of the $t^{th}$ degree or lower and a one-to-one function to generate n items of cheater-identification information $A\{i\}$ from n items of shared secret information. Cheater-identification information generation unit 102 supplies these items of cheater-identification information to storage devices 21-2n (Step S3). After Step S3, shared information generation device 10 ends the operations for secret sharing.

Figure 5:
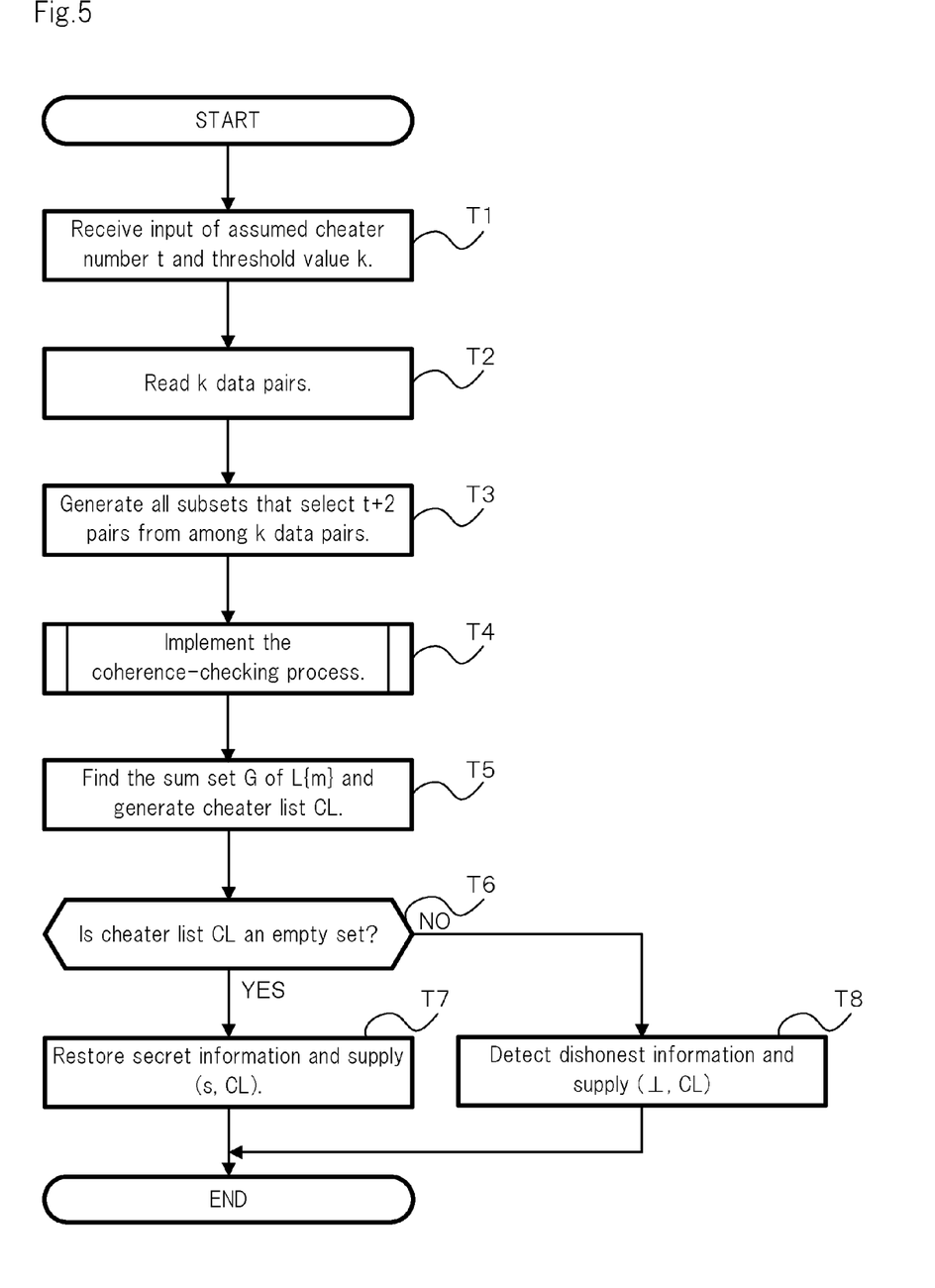
FIG. 5 is a flow chart showing the operations of the restoration device of the first exemplary embodiment of the present invention.
Figure 6:
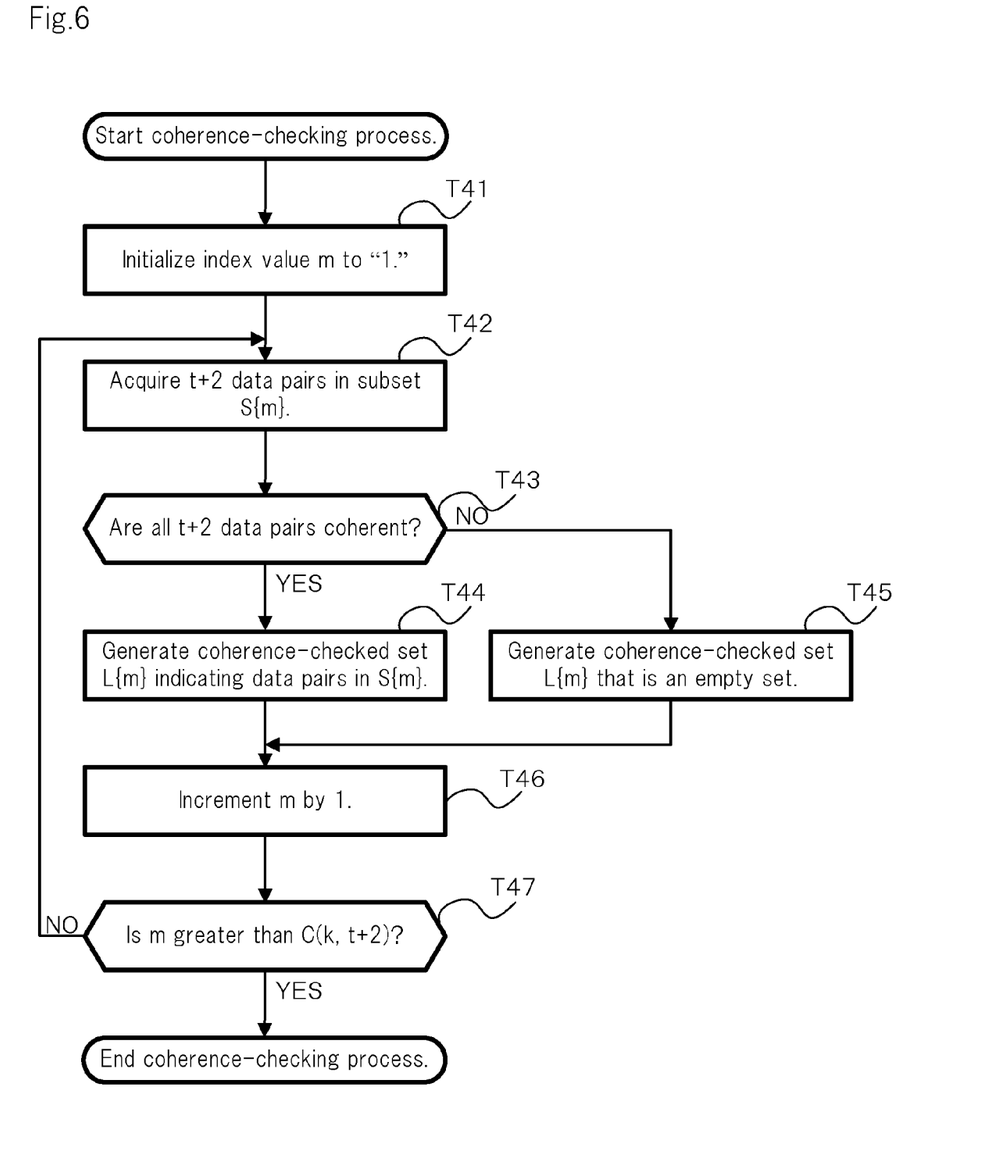
FIG. 6 is a flow chart showing the coherence checking process of the first exemplary embodiment of the present invention.

Referring to FIGS. 5 and 6, the operations of secret information restoration device 30 of the present exemplary embodiment are next described. FIG. 5 is a flow chart showing the operations of secret information restoration device 30. These operations begin with the execution of an application for restoring secret information.

Secret information restoration device 30 receives the input of assumed cheater number t and threshold value k (Step T1).

When assumed cheater number t and threshold value k are received, secret information restoration device 30 reads k items of shared information from k storage devices (Step T2).

Subset generation unit 301 finds as subsets all combinations that select t+2 items among the k items of shared information, and generates C(k, t+2) subsets $S\{m\}$. Subset generation unit 301 supplies these subsets to coherence checking unit 302 in accordance with a request of coherence checking unit 302 (Step T3).

Coherence checking unit 302 executes a coherence checking process for judging whether dishonest shared information is included in each subset (Step T4).

Cheater identification unit 303 finds the sum set G of coherence-checked sets $L\{m\}$ generated in the coherence checking process. Cheater identification unit 303 then finds the differential set between the set of {i_1}, ... {i_k} and sum set G as cheater list CL (Step T5).

Cheater identification unit 303 judges whether the cheater list CL is an empty set or not (Step T6).

If cheater list CL is an empty set (Step T5: YES), secret information restoration unit 304 restores secret information s from the k items of shared secret information v{i_j}. Secret information restoration unit 304 then supplies secret information s and cheaters list CL that is an empty set as output (Step T7).

If cheaters list CL is not an empty set (Step T5: NO), cheater identification unit 303 supplies cheaters list CL and a symbol indicating that dishonest shared information was detected (Step T8).

FIG. 6 is a flow chart showing the coherence checking process. Referring to FIG. 6, coherence checking unit 302 sets an initial value "1" to index m (Step T41).

Coherence checking unit 302 acquires all data pairs (shared information) in subset S{m} (Step T42). Coherence checking unit 302 uses a polynomial of the $t^{th}$ degree or less that was obtained from cheater-identification information and a one-to-one function to judge whether the acquired data pairs are all coherent (Step T43).

If there is coherence in all data pairs (Step T43: YES) coherence checking unit 302 generates coherence-checked set L{m} that indicates the set of data pairs in subsets S{m} (Step T44).

If coherence is lacking in any of the data pairs (Step T43: NO), coherence checking unit 302 generates a coherence-checked set L{m} that is an empty set (Step T45).

After Step T44 or T45, coherence checking unit 302 increments m (Step T46).

Coherence checking unit 302 judges whether m is greater than C(k, t+2) or not (Step T47).

If m is no greater than C(k, t+2) (Step T47: NO), coherence checking unit 302 returns to Step T42.

If m is greater than C(k, t+2) (Step T47: YES), coherence checking unit 302 ends the coherence checking process.

In the present exemplary embodiment, secret information restoration device 30 has a configuration that restores secret information if cheater list CL is an empty set. However, if there is no need to restore the shared information, secret information restoration device 30 can be of a configuration in which secret information restoration unit 304 is not provided.

Alternatively, although the number of elements r of each subset was set to t+2 in the present exemplary embodiment, r can be set to r>t+2. In this case as well, if a value of t that satisfies k≥r+t is applied as input in the secret-sharing system, there is a high probability that secret information restoration device 30 can detect up to t cheaters.

Even when r=t+2, there is a sufficiently high probability of 1−1/q, as previously described, that cheaters can be identified. Although the assumed cheater number that can be set for the same k decreases if r>t+2, the points on the polynomial that should match are more numerous than when r=t+2, and there is an even higher probability that cheaters can be identified. However, when r≥2t+1, the number t of cheaters that can be detected for the value of k drops below the number of cheaters of Non-Patent Document 5 that assumes the relation k≥3t+1. As a result, r is preferably set such that 2t≥r≥t+2.

In the present exemplary embodiment, the flow charts shown in FIGS. 4-6 are realized by the execution of a computer program by an information-processing device, but all or a portion of these parts may be realized by a control circuit in an information-processing device.

In the present exemplary embodiment, a configuration is adopted in which n items of shared information generated by shared information generation device 10 are shared and stored among storage devices 21-2n, and when secret information is restored, the shared information is delivered from k or more storage devices 2 to secret information restoration device 30. However, no particular restrictions apply to the method by which shared information is conveyed from shared information generation device 10 to storage devices 21-2n, or to the method by which shared information is conveyed from storage devices 21-2n to secret information restoration device 30. For example, the shared information may be conveyed by way of a storage medium or may be conveyed by data communication.

The secret information restoration device of the present invention is one example of the verification device of the present invention.

According to the present exemplary embodiment as described hereinabove, a verification device finds, as subsets, all combinations that select r items where r≥t+2 from k items of shared information obtained by using a polynomial of the $(k-1)^{th}$ degree on GF(p) and a polynomial of the $t^{th}$ degree on GF(q), judges for each subset whether dishonest shared information is included in the subset, and generates a cheater set. By means of this configuration, even if there are t dishonest items of shared information among k items of shared information, the verification device is able to judge that one or more items of dishonest shared information are not present among the subsets if there are r or more items of shared information that are not dishonest, and based on the judgment results of each subset, can identify, with high probability, up to t items of dishonest information among the k items.

As a result, up to t items of dishonest shared information can be detected where t satisfies the relation k≥r+t. If the range 2t≥r is set, the user can set the value of t that satisfies k≥3t in the verification device and can set t larger than for a case of k≥3t+1 with respect to k of a fixed value.

In addition, due to the use of a polynomial of the $(k-1)^{th}$ degree on a finite field based on p such as GF(p) and a polynomial of the $t^{th}$ degree on GF(q), the size of items of shared information is p*q. As a result, assuming that k≥2t+1, the size of an item of shared information is smaller than for the method of Non-Patent Document 4 in which the size of an item of shared information is p*q^(3n−3).

In particular, assuming r=t+2, the value of t with respect to the value of k can be set to a maximum while keeping the probability of the success of dishonesty low with respect to the value of k.

Second Exemplary Embodiment

The second exemplary embodiment of the present invention is next described. The secret sharing system of the present exemplary embodiment differs from the secret sharing system of the first exemplary embodiment in that it enables more flexible setting of parameters. In addition, regarding the secret sharing system of the present exemplary embodiment, explanation of constructions that are similar to those described in FIGS. 1-6 will be omitted and only points that differ from the first exemplary embodiment will be described in detail.

Secret information sharing unit 101 of the present exemplary embodiment has the same configuration as secret information sharing unit 101 of the first exemplary embodiment with the exception of the selection of polynomial fs(x) of the $(k-1)^{th}$ degree on GF(p^N) that is an enlargement of finite field GF(p).

In the present exemplary embodiment, addition on a finite field is indicated by +, subtraction by −, multiplication by *, division by /, and power by ^.

Cheater-identification information generation unit 102 of the present exemplary embodiment differs from the configuration of cheater-identification information generation unit 102 of the first exemplary embodiment in that cheater-identification information that is composed of two items of information is generated.

To state in greater detail, cheater-identification information generation unit 102 randomly selects unknown e of GF(p) and generates random and uniform polynomial Ce(x) of the $t^{th}$ degree on GF(p) such that Ce(0)=e. In the present exemplary embodiment, Ce(x) is defined by the following equation.

$$Ce(x)=e+e\{1\}x+\ldots+e\{t\}x^t \quad (5)$$

Cheater-identification information generation unit 102 substitutes i=1, 2, ... n as x into Ce(x) and takes the results as As{i} (=Ce(i)).

Cheater-identification information generation unit 102 further generates random and uniform polynomial Cs(x) of the $t^{th}$ degree on GF(q). Here, q is a prime number that satisfies q≥n*p. In the present exemplary embodiment, Cs(x) is defined by the following equation.

$$Cs(x)=c\{0\}+c\{1\}*x+\ldots c\{t\}*x^t \quad (6)$$

Cheater-identification information generation unit 102 then substitutes v{i} as x in the fe(x) described below to find fe(v{i}).

$$fe(x)=x\{0\}+x\{1\}*e+x\{2\}*e^2+\ldots+x\{N\}*e^N \quad (8)$$

Cheater-identification information generation unit 102 substitutes each n item of ({i}, fe(v{i})) into a predetermined one-to-one function φ({i}, fe(x)) to acquire φ({i}, fe(v{i})).

Cheater-identification information generation unit 102 then finds Cs(φ({i}, fe(v{i}))) and takes the result as Ae{i}.

Cheater-identification information generation unit 102 supplies As{i} and Ae{i} as cheater-identification information A{i}.

Next, other than the use of As{i_j}, Ae{i_j} (j=1, 2, . . . k) to carry out the coherence check, secret information restoration device 30 of the present exemplary embodiment is identical to secret information restoration device 30 of the first exemplary embodiment.

Coherence checking unit 302 judges whether (j_1, As{j_1}), . . . (j_(t+2), As{j_(t+2)}) are all points on the same polynomial of the $t^{th}$ degree or lower.

Coherence checking unit 302 then judges whether all of ((φ(j_1, v{j_1}), Ae{j_1}), . . . ((φ(j_(t+2), v{j_(t+2)}), Ae{j_(t+2)}) are points on the same polynomial of the $t^{th}$ degree or lower.

If points corresponding to As{i_j} are all points on the same polynomial of the $t^{th}$ degree or lower, and moreover, if points corresponding to Ae{i_j} are all points on the same polynomial of the $t^{th}$ degree or lower, coherence checking unit 302 judges that there is no dishonest information in the shared information in the subsets.

According to the present exemplary embodiment as described hereinabove, the size of an item of secret information is p^(N+1)*q, and the probability that falsification can be detected is 1−N/p−1/q. Although there was the limitation of q≥n*p between the size of shared secret information p and the probability of detecting dishonesty in the first exemplary embodiment, the limitation between the size of secret information and the probability of detecting dishonesty is cancelled in the second exemplary embodiment by the appropriate selection of p.

The present invention has been described hereinabove with reference to the exemplary embodiments, but the present invention is not limited to the above-described exemplary embodiments. The configuration and details of the present invention are open to various modifications within the scope of the present invention that will be clear to one of ordinary skill in the art.

This application claims the benefits of priority based on Japanese Patent Application No. 2009-290786 for which application was submitted on Dec. 22, 2009 and incorporates by citation all of the disclosures of that application.

What is claimed is:

1. A verification device, said verification device comprising:
   a computer, wherein said computer:
   takes as shared secret information each n item of information that is generated from secret information by a (k, n) threshold secret-sharing scheme that uses a polynomial of the $(k-1)^{th}$ degree on a finite field based on power p of a prime number;
   takes as q a prime number that satisfies the relation q≥n*p, takes as r and t natural numbers that satisfy k≥t+r, takes as cheater identification information n items of information generated by means of a t-Cheater Identifiable secret-sharing scheme that uses a polynomial of the $t^{th}$ degree on finite field GF(q) so as to enable identification of any of up to t items of dishonest shared secret information included in n items of said shared secret information; and
   identifies dishonest shared information from any k items of shared information among n items of shared information that are pairs of shared secret information and cheater-identification information;
   said computer comprising:
   an input device that receives as input k items of shared information and said t;
   a subset generation unit that generates all subsets that are combinations that select, from said k items of shared information applied as input to said input means, r items of shared information where r≥t+2;
   a coherence checking unit that, by using each item of cheater-identification information that belongs to the subset and a polynomial of the $t^{th}$ degree, judges for each of said subsets that were generated by said subset generation unit whether dishonest shared information is contained in the subset; and
   a cheater unit that, based on the judgment result by said coherence checking unit and the shared information contained in each subset, identifies dishonest shared information.

2. The verification device as set forth in claim 1, wherein said r is a natural number that satisfies 2t≥r≥t+2.

3. The verification device as set forth in claim 1, wherein said r is t+2.

4. The verification device as set forth in claim 1, wherein:
   the finite field based on said p is GF(p);
   said cheater-identification information is information obtained by substituting φ({i}, v{i}) in a polynomial of the $t^{th}$ degree on said GF(q), where said shared secret information is v{i} (i=1, 2, ... n) and φ is a one-to-one function; and
   said coherence checking unit judges whether dishonest shared information is included in the subset according to whether (φ({j_1}, v{j_1}), A({j_1}), . . . (φ({j_(t+2)}, v{j_(t+2)}), v{j_(t+2)}) are all points on the same polynomial of the $t^{th}$ degree or lower, where said shared secret information belongs to said subsets as v{j_1}, ... v{j_k} and said cheater-identification information belongs to the subset as A{j_1}, ... A{j_k}.

5. The verification device as set forth in claim 4, wherein:
said coherence checking unit generates as a coherence-checked set the set {j_1}, ... {j_(t+2)} upon judging that, for each of said subsets, dishonest shared information is not included in the subset, and upon judging that dishonest shared information is included in the subset, generates an empty set as the coherence-checked set; and
said cheater identification unit generates, as said cheater set, the differential set between the sum set of said coherence-checked sets for each said subset that was generated by said coherence checking unit and the set {i_1}, ... {i_k}.

6. A secret information restoration device comprising:
the verification device as set forth in claim 5; and
a secret information restoration unit that restores and supplies said secret information from k items of said shared secret information if said cheater set that was generated by said cheater identification unit is an empty set.

7. The verification device as set forth in claim 1, wherein:
the finite field based on said p is $GF(p^N)$;
said cheater-identification information includes:
As{i} that is obtained by substituting {i} (i=1, 2, ... n) into a first polynomial of the $t^{th}$ degree on said $GF(p^N)$; and
Ae{i} that is obtained by substituting φ({i}, fe(v{i})) into a second polynomial of the $t^{th}$ degree on said GF(q), where said shared secret information is v{i}, function fe(x) is fe(x)=x{0}+x{1}*e+x{2}*e^2+...+x{N}*e^N, and φ is a one-to-one function; and
said coherence checking unit judges whether dishonest shared information is included in the subset according to whether (j_1, As{j_1}), ... (j_(t+2), As{j_(t+2)}) are all points on the same polynomial of the $t^{th}$ degree or lower, and moreover, whether ((φ(j_1, v{j_1}), Ae{j_1}), ... ((φ(j_(t+2), v{j_(t+2)}), Ae{j_(t+2)}) are all points on the same polynomial of the $t^{th}$ degree or lower.

8. A verification method, said verification method causes a computer to perform the steps of:
taking as shared secret information each n item of information that is generated from secret information by a (k, n) threshold secret-sharing scheme that uses a polynomial of the $(k-1)^{th}$ degree on a finite field based on power p of a prime number;
taking as q a prime number that satisfies the relation q≥n*p, taking as r and t natural numbers that satisfy k≥t+r, and taking as cheater identification information n items of information generated by means of a t-Cheater Identifiable secret-sharing scheme that uses a polynomial of the $t^{th}$ degree on finite field GF(q) so as to enable identification of any of up to t items of dishonest shared secret information included in said n items of shared secret information, and
identifying dishonest shared information from any k items of shared information among n items of shared information that are pairs of shared secret information and cheater-identification information;
said verification method comprising:
generating all subsets that are combinations that select, from k items of shared information, r items of shared information where r≥t+2;
judging, for each of the subsets that were generated, whether dishonest shared information is contained in the subset by using each item of cheater-identification information that belongs to the subset and a polynomial of the $t^{th}$ degree; and
based on the judgment results and shared information contained in each subset, identifying dishonest shared information.

9. A secret sharing system comprising:
a computer comprising:
a secret information sharing unit that generates n items of shared secret information from secret information by means of a (k, n) threshold secret-sharing scheme that uses a polynomial of the $(k-1)^{th}$ degree on a finite field based on a power p of a prime number, that takes as q a prime number that satisfies the relation q≥n*p and takes as r and t natural numbers that satisfy k≥t+r to generate n items of cheater-identification information by means of a t-Cheater identifiable secret-sharing scheme that uses a polynomial of the $t^{th}$ degree on a finite field GF(q) so as to enable identification of any of up to t items of dishonest shared information among said n items of shared information, and that supplies n items of the shared secret information and n items of the cheater-identification information; and
a verification device that, upon input of any k items of shared information among n items of shared information that are pairs of shared secret information and cheater-identification information generated by said secret information sharing device and said t, generates all subsets that are combinations that select, from the k items of shared information, r items of shared information where r satisfies r≥t+2, judges for each subset whether dishonest information is included in the subset by using each item of cheater-identification information that belongs to the subset and a polynomial of the $t^{th}$ degree, and based on the judgment result and the shared information that is contained in each subset, identifies dishonest shared information.

* * * * *

UNITED STATES PATENT AND TRADEMARK OFFICE
CERTIFICATE OF CORRECTION

| | | |
|---|---|---|
| PATENT NO. | : 8,861,717 B2 | |
| APPLICATION NO. | : 13/514073 | |
| DATED | : October 14, 2014 | |
| INVENTOR(S) | : Obana | |

It is certified that error appears in the above-identified patent and that said Letters Patent is hereby corrected as shown below:

In the Specification

Column 7, Line 32: Delete "v{I}" and insert -- v{i} --

Signed and Sealed this
Thirty-first Day of March, 2015

Michelle K. Lee
*Director of the United States Patent and Trademark Office*